United States Patent

Lee

Patent Number: 5,791,192
Date of Patent: Aug. 11, 1998

[54] BALL RETURN AND PIECE STRUCTURE OF INTERNAL CIRCULATION TYPE BALL SCREW SYSTEM

[76] Inventor: Mouton Lee, No. 93, Chung-Shan Rd., Tu-Cheng Ind. District, Taipei Hsien, Taiwan

[21] Appl. No.: 806,151

[22] Filed: Feb. 25, 1997

Related U.S. Application Data

[63] Continuation of Ser. No. 316,467, Oct. 3, 1994, abandoned.

[51] Int. Cl.⁶ .................................................. F16H 55/17
[52] U.S. Cl. .................... 74/459; 74/424.8 R; 74/89.15
[58] Field of Search .......................... 74/459, 424.8 R, 74/89.15

[56] References Cited

U.S. PATENT DOCUMENTS

| | | | |
|---|---|---|---|
| 3,306,124 | 2/1967 | Adams | 74/459 |
| 3,971,264 | 7/1976 | Detraz et al. | 74/459 |
| 4,750,378 | 6/1988 | Sheppard | 74/459 |
| 4,864,883 | 9/1989 | Mayfield | 74/424.8 R |
| 4,905,534 | 3/1990 | Andonegui | 74/459 |
| 4,953,419 | 9/1990 | Schlenker | 74/424.8 R |
| 5,005,436 | 4/1991 | Brusasco | 74/459 |
| 5,303,607 | 4/1994 | Katahira | 74/459 |
| 5,373,755 | 12/1994 | Rohlinger | 74/459 |
| 5,454,278 | 10/1995 | Kasuga | 74/459 |

*Primary Examiner*—Charles A. Marmor
*Assistant Examiner*—David M. Fenstermacher
*Attorney, Agent, or Firm*—Harold L. Novick; Nath & Associates

[57] ABSTRACT

A structure of a ball return piece and its process of manufacture, and more importantly to the return piece of the internal circulation type ball screw system. The guide groove of the return piece is formed in the shape of a closed circular pipe to provide a precise pipe diameter for guiding the ball in a gliding fashion past the return piece. The return piece is produced by monoblock casting for ensuring enough strength to endure the strong impact stress upon it generated during the circulation of the balls and for preventing damage to the return piece. Moreover, since the guide groove of the return piece is to be formed in the shape of a closed circular pipe, a precise pipe diameter is required and can be achieved by precision lost wax casting. This provides the ball with stable guidance when passing the return piece.

4 Claims, 5 Drawing Sheets

(A)

(B)

BALL RETURN AND PIECE STRUCTURE OF INTERNAL CIRCULATION TYPE BALL SCREW SYSTEM

This application is a continuation of application Ser. No. 08/316,467 filed Oct. 3, 1994 now abandoned.

BACKGROUND OF THE INVENTION

The present invention is directed to a ball return piece in which the internal circulation type ball screw system is manufactured by precision lost wax casting.

DESCRIPTION OF THE PRIOR ART

Conventional ball screw systems are made to achieve a driving effect of high efficiency, high precision, and high endurance of rub by minimizing friction resistance and the locating effect of the circularly rolled balls attached between the nut and the screw. The systems are divided into the internal circulation type which guides the ball with the return piece, and the external circulation type which guides the ball with a circulation pipe for the aforementioned balls to rotate with respect to the nut. The internal system is the type preferably discussed in this application. The typical features of so called internal circulation type of ball screws systems are illustrated in FIGS. 7(A) and 7(B), wherein the ball return pieces are inlaid into the built-up grooves formed on both sides of the interior of the nut, and a penetrating access is excavated through the body of the nut between these two return pieces. The ball rolling into one of the return piece enters the thread orbit again from the other return piece through the aforementioned penetrating access, so the purpose of circularly rolling the ball is achieved.

The return piece shown in FIGS. 7(A) and 7(B) is reprocessed on one side of central portion for forming a guide groove of opening condition. Then, after the return piece is inlaid into the built-up groove, a ball-guiding closed pipe, which is formed by the wall of the built-up groove incorporating the guide groove, guarantees the circularly rolling of the ball in the thread orbit of the ball screw system.

The pipe provided for guiding the ball discussed previously is formed by the wall of the built-up groove incorporating the guide groove of the return piece, so the total precision error of the pipe diameter is contributed to by the foregoing elements, since the pipe diameter is not easily controlled with precision. If the pipe diameter is too small, unexpected friction resistance is formed between the ball and the pipe wall as the ball passes the pipe. On the other hand, if pipe diameter is too large, the axial contact is not easily maintained between the balls in the pipe and power is lost because the balls are jostled and do not glide or roll during transmission.

Moreover, the guide grooves of the return pieces fixed on both sides of the nut communicate with each other through the penetrating access of the nut. If the precision of the reprocessed built-up groove provided by the nut for the return piece to be inlaid into is insufficient, a discontinuity is produced in the junction between them, and that affects the passage of the ball as well.

SUMMARY OF THE INVENTION

In view of the foregoing description, in response to the disadvantages of the design of the aforementioned guide groove of conventional return pieces, a return piece was developed, wherein the guide groove for the ball comprises a closed circular pipe which provides a precise pipe diameter for guiding the ball in a gliding fashion past the return piece. T he return piece is produced by monoblock casting for insuring enough strength to endure the strong impact stress upon it generated during the circulation of the balls, and for preventing damage to the return pieces.

Moreover, since the guide groove of the return piece is to be formed in a closed circular pipe shape, a precise pipe diameter is required and can be achieved by precision lost wax casting. This provides th e ball with stable guidance when passing the return piece.

DETAILED DESCRIPTION OF THE PREFERRED EMBODIMENT

Figure 1:
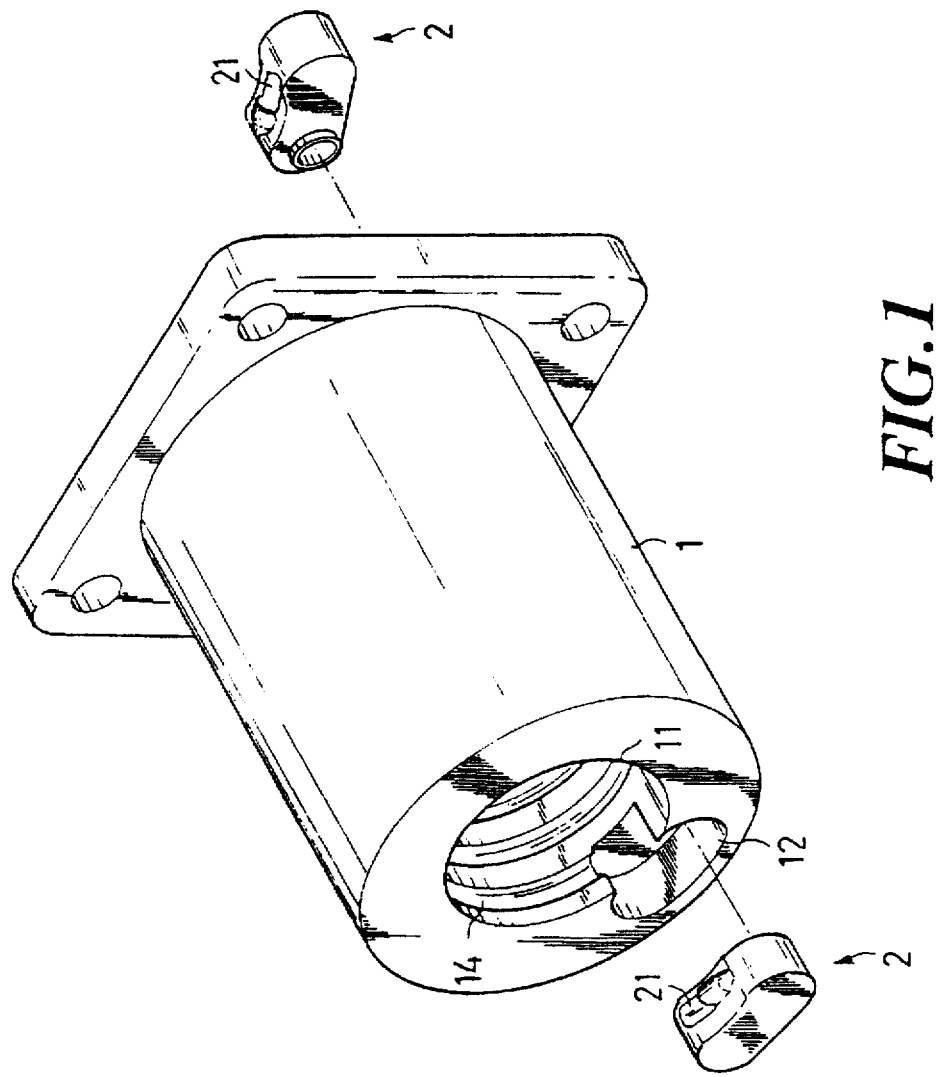
FIG. 1 is a perspective view of the decomposition according to the invention.
Figure 3:
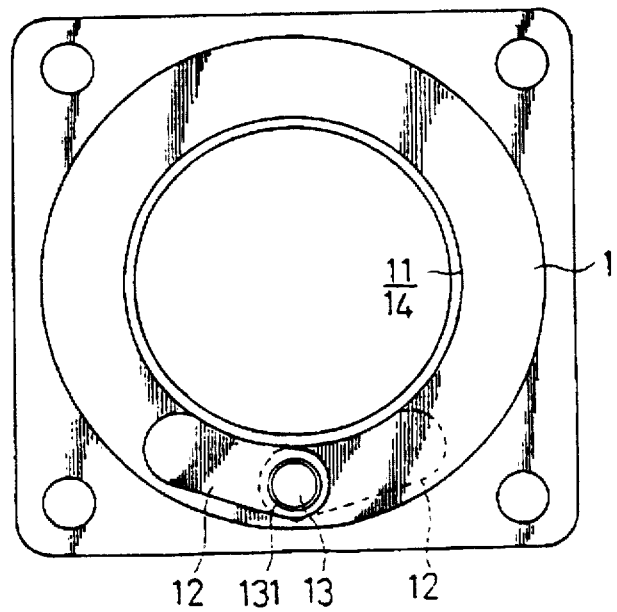
FIG. 3 is a diagram of the pending of the penetrating access in the nut and the built-up groove relative to the return piece.

FIG. 1 is a view illustrating a preferred ball nut embodiment in accordance with this invention. The ball nut includes a nut body (1), ball return pieces (2,2) wherein the nut body (1) provides an internal hole (11) on the axial center for the screw (3) to insert into, and two built-up grooves (12,12) on the corresponding side edges of the internal hole (11) for the return pieces (2,2) to be inlaid into. The nut body (1) has a penetrating access (13) between the built-up grooves (12, 12), wherein the diameter of the access permits passage of the ball (4); and has scarf grooves (131,131) which are formed on both sides, as shown in FIG. 3.

Figure 2:
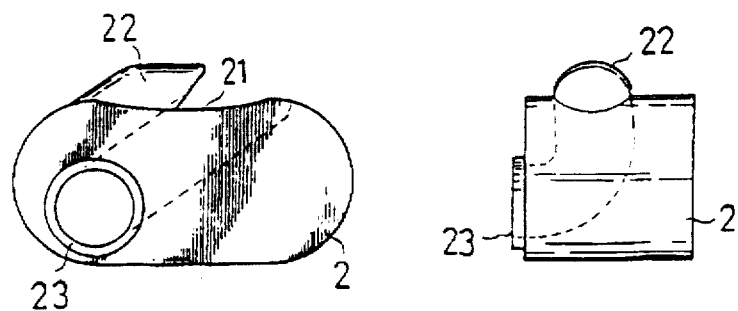
FIGS. 2(A), (B), and (C) are the front, side, and top views of the return piece respectively.
Figure 2:
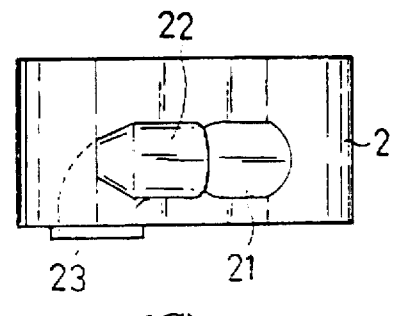

Since the aforementioned return pieces (2,2) inlaid into the built-up grooves (12,12) of the nut body (1) correspond to the same design, only one is described herein. The return piece (2) is a metal block, as illustrated in FIGS. 2(A), 2(B), and 2(C). A guide groove (21), formed in the state of closed circular pipe, is approximately on the central portion of the return piece, wherein the diameter of the guide groove (21) permits the ball to pass. Both sides of guide groove (21) are connected and aligned with the foregoing penetrating access (13) and the ball thread orbit (14) of the nut body (1) respectively. Moreover, a locating ring (23) inlaid with the scarf groove (131) of the penetrating access (13) is formed on the guide groove (21) at the position relative to the penetrating access (13), as shown in FIG. 5.

The built-up groove (12) of the aforementioned nut body (1) provides the return piece (2) with a tight engagement which is secured by the tight fitting screw (not shown) of the nut body (1) or other securing means. There is no restriction in this embodiment, so the return piece (2) in the nut body (1) will not loosen or be disengaged under vibrating operation.

After return piece (2) is set relative to the built-up groove (12), a complete circular passage is formed by the connection of the return pieces (2,2) the ball thread orbit (14), and the axial penetrating access (13) of the nut body (1).

Figure 4:
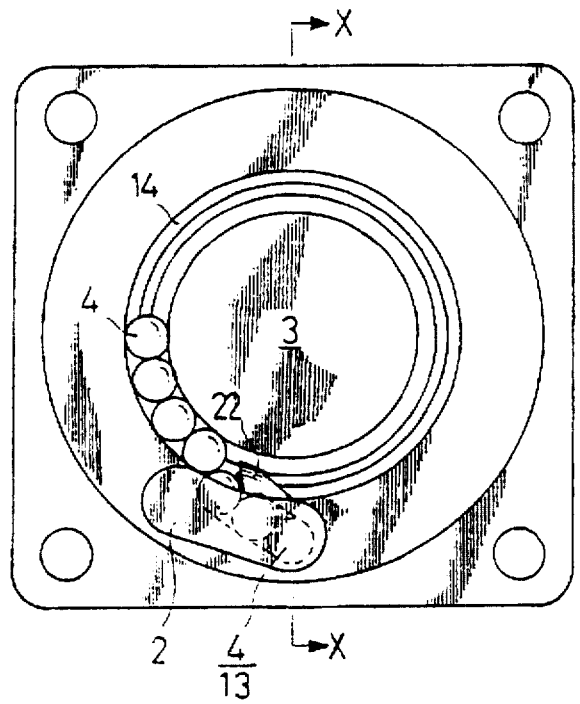
FIG. 4 is a diagram of the return piece being a guidance for the ball in the guide groove and the penetrating access.
Figure 5:
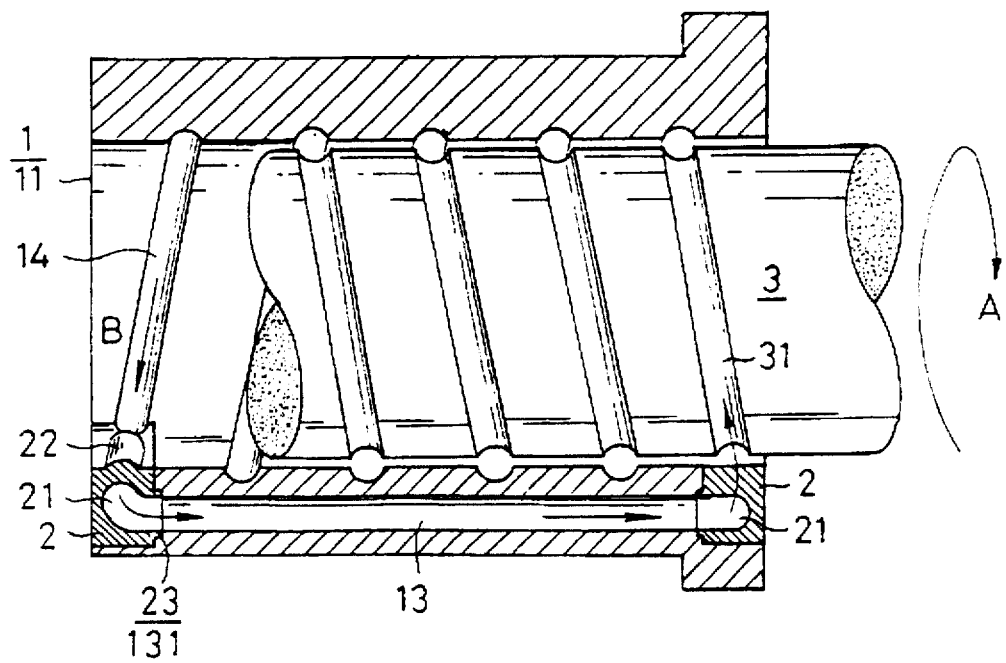
FIG. 5 is a cross-sectional view of FIG. 4 indicating the combination relation between the locating ring of the return piece and the scarf groove of the penetrating access.

The preferred embodiment is shown in FIGS. 4 and 5 where the ball screw is formed by the assembled nut body (1), screw (3), ball (4), and other elements concerned. The ball (4) is rolling (in the arrow B direction) between the thread orbit (14) of the nut body (1) and the ball groove (31) of the screw (3) as the screw (3) is driven to rotate in a set direction (indicated by arrow A) by the power source. When the ball (4) reaches the area of the guide groove (21) in the return piece (2) and contacts the guiding part (22), it is guided by the guiding part (22) and moves along the guide groove (21) to the outside of the internal hole in the nut body (1) where the ball (4) is gradually disengaged from the area of the thread orbit (14). Thereafter, ball (4) enters the penetrating access (13) corresponding to the other aperture of the guide groove (21) along the guide groove (21) and arrives the other return piece (2) on the other side. Similarly, the ball (4) enters the area between the thread orbit (14) and the ball groove (31) along the guide groove (21) and the guiding part (22) again, so the purpose of rolling the ball (4) circularly is achieved.

The guide groove (21) in the return piece (2) of this invention is formed in the state of closed circular pipe to provide a precise pipe diameter for guiding the ball (4) to glidingly pass the return piece (2). A design of monoblock casting for the return piece is utilized for insuring enough strength to endure the strong impact stress upon it generated during the circulation of the balls (4) and for preventing Damage to the return pieces. The return piece is produced by monoblock casting for insuring enough strength to endure the strong impact stress upon it generated during the circulation of the balls so as to prevent the return piece from being damaged.

Moreover, the scarf groove (131) on the end of the penetrating access (13) is inlaid with the locating ring (23) on one end of the guide groove (21) in the return piece (2), as shown in FIG. 5. So even if the precision of the reprocessed built-up groove (12) providing the return piece (2) to be inlaid into on the nut body (1) is insufficient, the scarf groove (131) is able to slightly adjust the guide groove (21) for correctly locating and aligning it with the penetrating access (13) by the locating ring (23) so the ball (4) can glidingly pass the junction.

Figure 6:
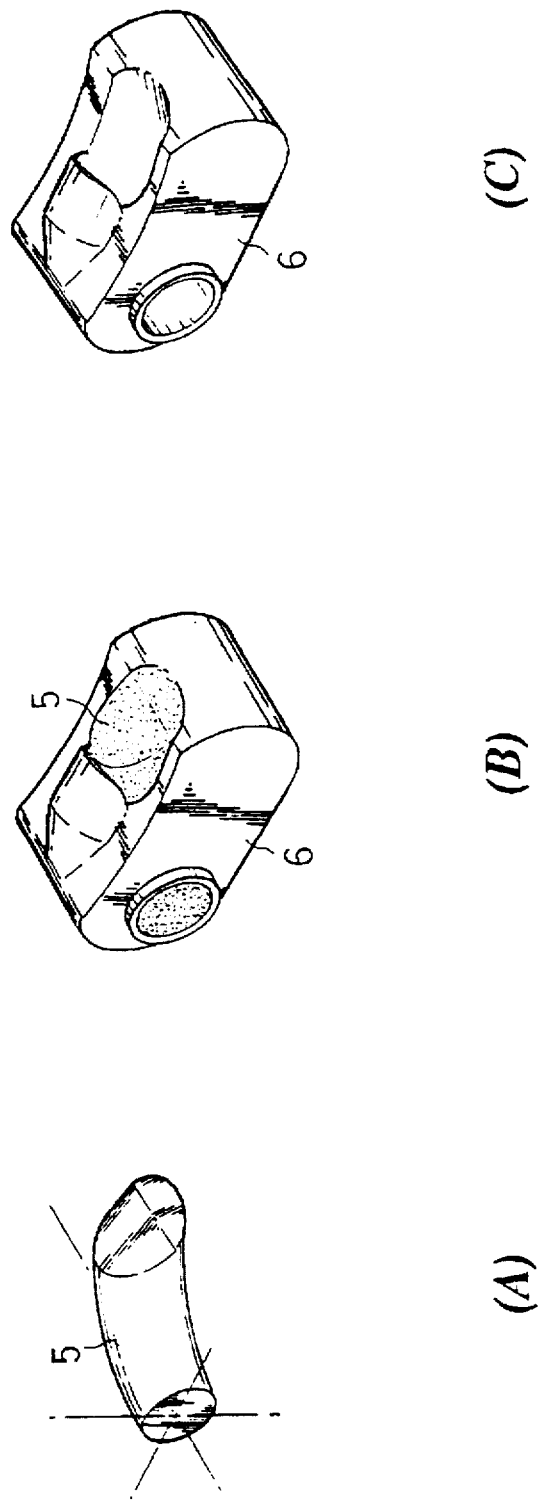
FIGS. 6(A), (B), (C) shows the steps of manufacturing the return piece by the lost wax casting in this invention.
Figure 7:
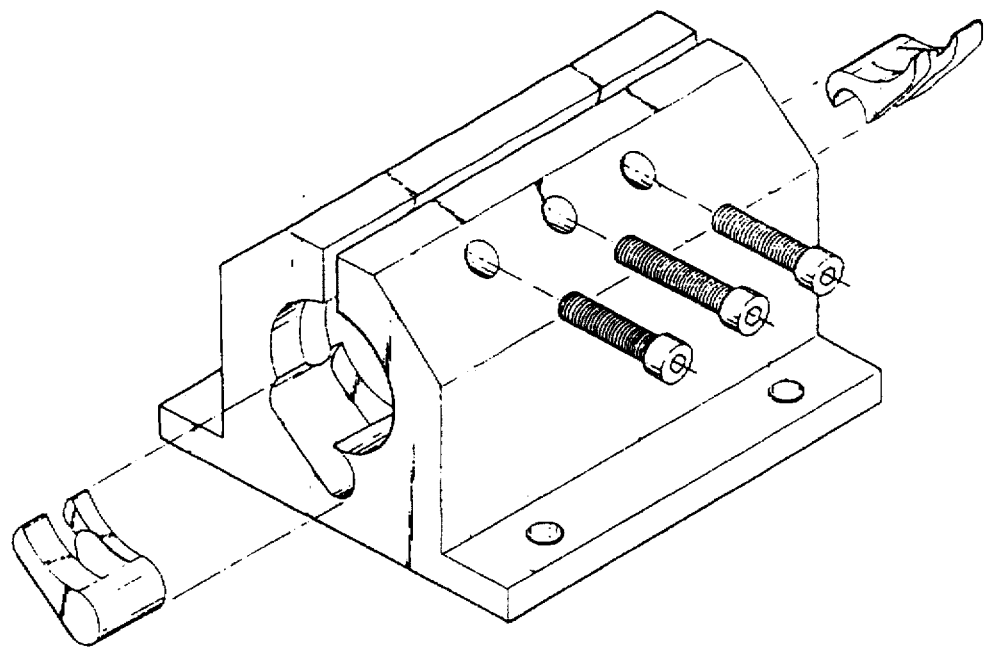
FIGS. 7(A) and (B) show the conventional internal circulation type ball screw system and its return piece.
Figure 7:
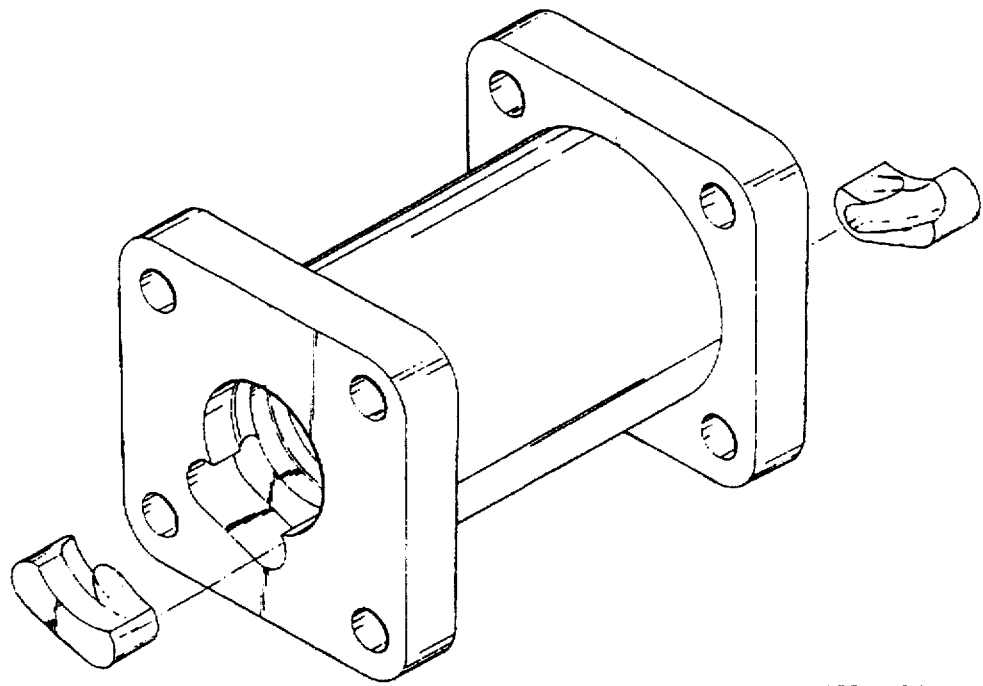

As in the foregoing description, the guide groove (21) in the return piece (2) of this invention is formed in the state of closed circular pipe and is a design of monoblock casting. Since the guide groove (21) really provides the ball (4) with a guide, precise casting is required, so it is impossible to manufacture the shape of the guide groove (21) by a common cutting machine. The manufacture of the guide groove (21) formed in a closed circular pipe condition in the return piece (2) according to this invention is illustrated in FIG. 6.

The aforementioned manufacture is achieved by precision lost wax casting. Essentially, as illustrated in FIG. 6 (A), a core die (5), the shape of which is similar to that of the guide groove (21), is formed by the water-soluble wax first, and the dimension thereof must account for the dilatation and the contraction of the material utilized during the process in consideration. The fusion point of the water-soluble wax is 83° C.–88° C. and the softing point is 78° C. It also may be dissolved in an aqueous solution of diluted hydrochloric acid under normal temperature. Therefore, manufacture comprises locating the core die (5) in the master die (not shown), the internal shape of which is similar to that of the return piece (2); squirting the ordinary wax into the master die (6) to surround the core die (5), and exposing the two ends of the core die (5); to the outside of the wax die (6), as shown in FIG. 6(B). The fusion point of the ordinary wax is lower than that of the water-soluble wax and is within the range of 76° C.–79° C. Its solidifying point is within 62° C.–65° C., so the core die (3) produced by water-soluble wax is not melted by the temperature of the ordinary wax when it is surrounded by the ordinary melting wax. Therefore, the shape and the precision of the dimension of the core die (5) are not changed. Squirting the aqueous solution of diluted hydrochloric acid, which is of normal temperature, into the wax die (6), only melts the core die (5) and expels it from the wax die (6) because the aqueous solution of diluted hydrochloric acid is of normal temperature and is lower than the solidifying point of the ordinary. The aqueous solution of diluted hydrochloric acid and its temperature has no influence on the wax die (6), and the wax die (6), with a cavity has the same shape as the return piece (2) which has a guide groove (21), as shown in FIG. 6(C).

Moreover, one should attach the mire formed by mixing the agglutinate and the particulate refractory material to the surface of the accomplished wax die (6), and then overlay a layer of refractory granular mire thereon. After the mire is dried, the wax die (6) is heated to melt it, and then drained away to form a hollow shell die. A return piece (2) is then formed by squirting the melted metal into the shell die.

Summarizing the foregoing description, the present invention relates to a structure of a ball return piece and its process of manufacture, and more importantly to the return piece of the internal circulation type ball screw system. The guide groove of the return piece is formed in the shape of a closed circular pipe to provide a precise pipe diameter for guiding the ball in a gliding fashion past the return piece. The return piece is produced by monoblock casting for ensuring enough strength to endure the strong impact stress upon it generated during the circulation of the balls and for preventing damage to the return piece. Moreover, since the guide groove of the return piece is to be formed in the shape of a closed circular pipe, a precise pipe diameter is required and can be achieved by precision lost wax casting. This provides the ball with stable guidance when passing the return piece.

I claim:

1. A first and a second ball return piece in combination with an internal circulation type ball screw system, said ball screw system comprising a nut body having a threaded bore therein, the bore thread defining a ball thread groove, an internal passageway having an opening at each end that is in communication with said ball thread groove, and a scarf groove formed in each of said passageway openings; and each said ball return piece being made from a block so as to comprise a guide groove formed in a central portion of said ball return piece, said guide groove having a closed circular pipe shape, wherein two sides of said guide groove are connected and aligned respectively with said internal passageway of said ball screw system and said ball thread groove and having a locating ring inlaid within a corresponding scarf groove.

2. A ball return piece for use in an internal circulation type ball screw system, which system includes a nut body having a threaded bore therein, the bore thread defining a ball thread groove, an internal passageway having an opening at each end that is in communication with the ball thread groove through said ball return piece, and means for positioning said ball return piece in one of the passageway openings;

said ball return piece being one piece and comprising a housing having a plurality of sides;

a guide groove formed in a central portion of said housing, said guide groove comprised of a central enclosed pipe-like passageway having a circular cross-section and two openings in communication with corresponding ends of said passageway, each opening being located in a different side of said housing, said different sides being mutually orthogonal, said openings having a location, shape and configuration such that when said ball return piece is mounted on the nut body, the openings of the ball return piece are aligned with the internal passageway and the ball thread groove of the ball screw system and a connection is made between the ball thread groove and the internal passageway of the nut body; and further means in cooperation with the ball screw system positioning means for positioning said ball return piece in said passageway opening.

3. A ball return piece as claimed in claim 2 wherein said further positioning means of the ball screw system comprises a scarf groove; and wherein said further positioning means of said ball return piece comprises a locating ring extending around and projecting out from one of said ball return piece openings.

4. A ball return piece as claimed in claim 3 wherein said other of said ball return piece openings is comprised of an open trench that mates with the ball thread groove when installed, and that has a slanted floor and two spaced apart guide walls.

* * * * *